Sept. 15, 1953      B. L. SAMUELSEN      2,652,235
HEATING ATTACHMENT FOR ELECTRIC FOOD MIXERS
Filed Nov. 29, 1951      2 Sheets-Sheet 1

Beatrice L. Samuelsen
INVENTOR.

Sept. 15, 1953 B. L. SAMUELSEN 2,652,235
HEATING ATTACHMENT FOR ELECTRIC FOOD MIXERS
Filed Nov. 29, 1951 2 Sheets-Sheet 2
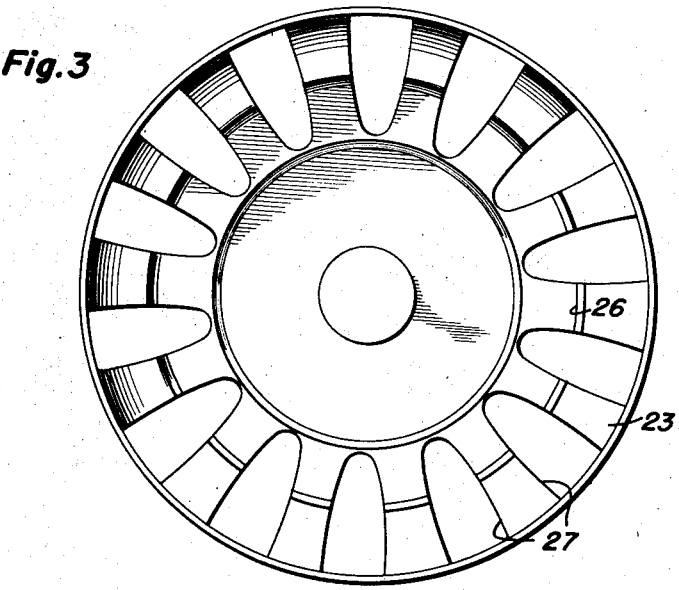
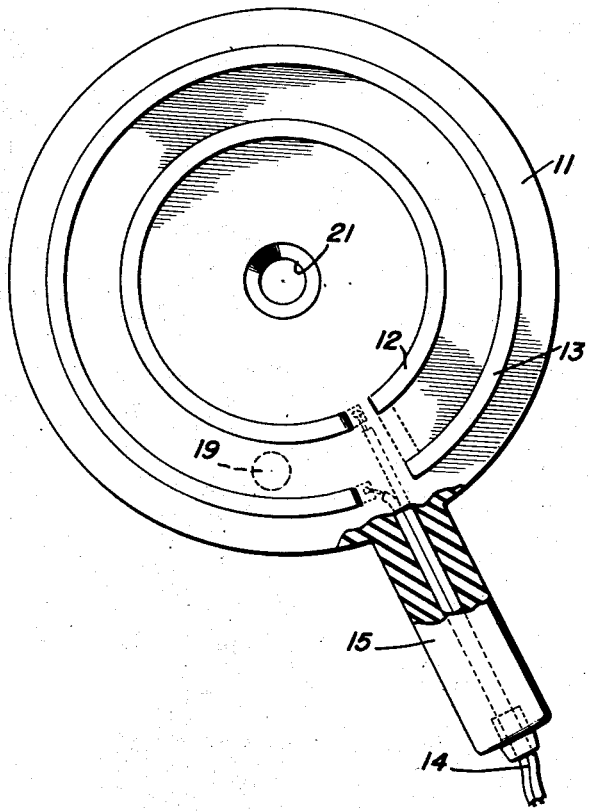
Beatrice L. Samuelsen
INVENTOR.

Patented Sept. 15, 1953

2,652,235

UNITED STATES PATENT OFFICE 2,652,235

HEATING ATTACHMENT FOR ELECTRIC FOOD MIXERS

Beatrice L. Samuelsen, Ketchikan, Territory of Alaska

Application November 29, 1951, Serial No. 258,880

2 Claims. (Cl. 259—84)

The present invention relates to new and useful improvements in electric food mixers and more particularly to a heating attachment for various types of food while the same is being stirred by the mixer.

An important object of the invention is to provide a heating attachment which may be mounted on the usual base of an electric mixer without necessitating any changes or alterations in the construction of the latter and including a turntable rotatably supported above an electric heating coil and constructing the turntable to support a bowl for containing the food whereby the food may be heated or cooked as the same is being stirred by the mixer.

A further object of the invention is to provide an electric hot plate in which turntables of various types or sizes may be interchangeably and rotatably mounted.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a top plan view of the turntable, and

Figure 4 is a top plan view of the hot plate with parts broken away and shown in section.

Figure 1:
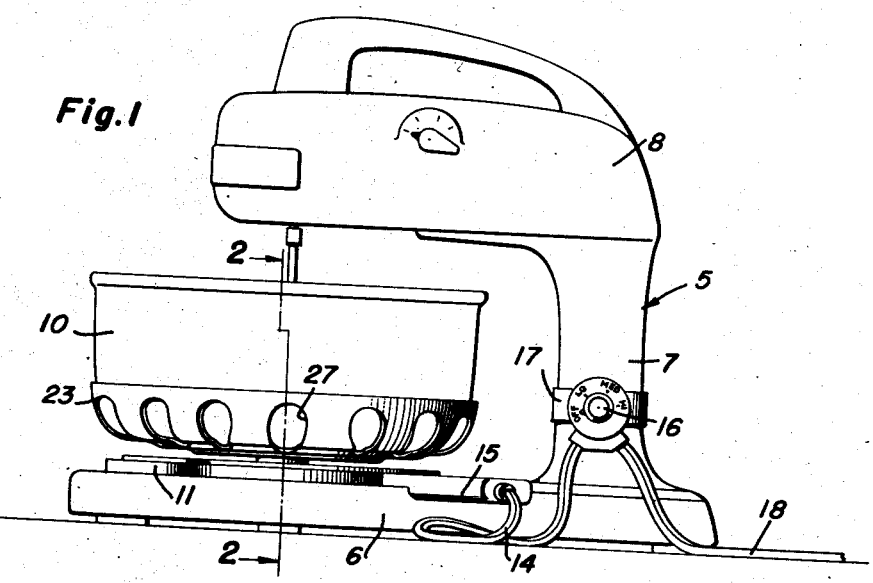
Figure 1 is a side elevational view.
Figure 2:
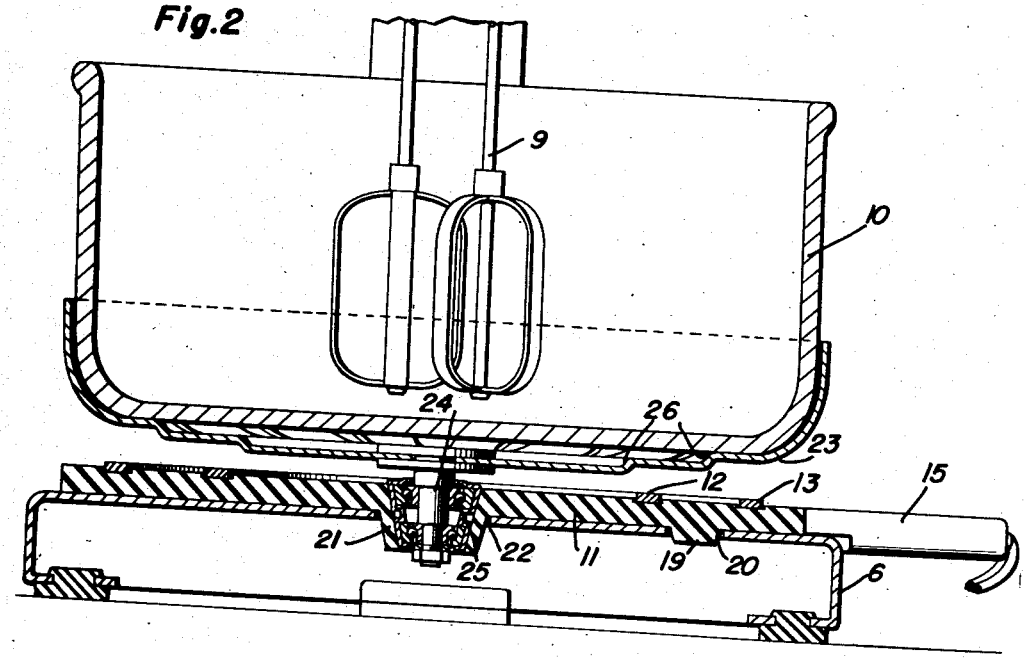
Figure 2 is an enlarged vertical sectional view taken on the line 2—2 of Figure 1.

Referring now to the drawings in detail wherein for the purpose of illustration I have disclosed a preferred embodiment of the invention, the numeral 5 designates a conventional type of electric food mixer which includes a hollow base 6 and standards 7 supporting the motor housing 8 in a position overlying the base, the agitator or beaters 9 extend downwardly from the outer end of the motor housing to enter a bowl 10 in which the food to be stirred or agitated is placed.

The present invention comprises means for heating the contents of the bowl as the same is being agitated or stirred and includes an electric hot plate or unit 11 of insulation material having inner and outer electric heating rings 12 and 13 recessed in concentric arrangement in the upper surface of the hot plate 11. Circuit wires 14 lead from the rings 12 and 13 through a handle 15 projecting radially from one edge of the hot plate to a temperature control switch or rheostat 16 secured to the side of the standard 7 by a clamp 17 and circuit wires 18 lead from the switch or rheostat 16 to a suitable source of current.

An eccentric lug 19 projects downwardly from the underside of the hot plate 11 to enter an opening 20 in the upper surface of the base 6 to prevent the hot plate from turning on the base and a tapered hub 21 extends downwardly from the central portion of the hot plate 11 into a central opening 22 in the base 6.

A cup or pan-shaped turntable 23 is mounted in spaced relation above the hot plate 11 by means of a shaft 24 at the underside of the turntable and secured at its upper end to the central portion of the turntable to extend downwardly in the hub 21. Ball bearing assemblies 25 are secured to the shaft 24 and are fitted in the hub to rotatably support the shaft 24 therein.

The inside of the turntable 23 is formed with concentric stepped recesses 26 to receive bowls of various sizes and to hold the bowls from lateral shifting movement in the turntable.

The sides and bottom of the turntable 23 are formed with heating openings 27 to expose the bottom and side portions of the bowl to the direct action of heat from the electric heating elements or rings 12 and 13.

In the operation of the device the hot plate 11 is placed in position on the base 6 of the electric mixer 5 and the turntable 23 with the shaft 24 projecting downwardly from the center thereof is placed in the hub 21 of the hot plate. Accordingly, the food contained in the bowl 10 placed in the turntable will be heated by the hot plate and the agitation of the food by the stirrers 9 will cause the bowl and turntable 23 to rotate as the food is being heated or cooked.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A heating attachment for electric food mixers having a base provided with a central opening, said attachment comprising a hot plate of insulation material having a tapered hub at its underside positioned in the opening for centering the hot plate on the base, a turntable having a shaft projecting downwardly therefrom, and tapered bearing means for the shaft and adapted for wedging self-supporting engagement in the central opening to rotatably support the turntable in an elevated position above the base.

2. A heating attachment for electric food mixers having a base provided with a central opening and an eccentric opening, said attachment comprising an electric hot plate having a hub projecting downwardly at its underside positioned in the central opening and an eccentric lug at its underside positioned in the eccentric opening to hold the hot plate non-rotative on the base, a perforated pan-like turntable above the hot plate and adapted to hold a bowl containing food to be stirred by the mixer and to be heated by the hot plate, a vertical shaft extending downwardly at the underside of the turntable, and tapered bearing means for the shaft and having wedging self-supporting engagement in the hub to rotatably support the turntable in an elevated position above the hot plate.

BEATRICE L. SAMUELSEN.

References Cited in the file of this patent

UNITED STATES PATENTS

| Number | Name | Date |
|---|---|---|
| 1,174,031 | Hadaway | Feb. 29, 1916 |
| 1,944,245 | Krause | Jan. 23, 1934 |
| 2,016,554 | Nichols | Oct. 8, 1935 |